United States Patent
Wolfson et al.

(10) Patent No.: US 11,099,925 B2
(45) Date of Patent: Aug. 24, 2021

(54) DATACENTER PREEMPTIVE MEASURES FOR IMPROVING PROTECTION USING IOT SENSORS

(71) Applicant: EMC IP Holding Company LLC, Hopkinton, MA (US)

(72) Inventors: Kfir Wolfson, Beer Sheva (IL); Jehuda Shemer, Kfar Saba (IL); Assaf Natanzon, Tel Aviv (IL)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/031,936

(22) Filed: Jul. 10, 2018

(65) Prior Publication Data

US 2020/0019455 A1    Jan. 16, 2020

(51) Int. Cl.
*G06F 11/00* (2006.01)
*G06F 11/07* (2006.01)
*G06F 21/60* (2013.01)

(52) U.S. Cl.
CPC ...... *G06F 11/0793* (2013.01); *G06F 11/0709* (2013.01); *G06F 11/079* (2013.01); *G06F 11/0751* (2013.01); *G06F 21/60* (2013.01)

(58) Field of Classification Search
CPC ............... G05B 23/0283; G06F 11/004; G06F 11/0751; G06F 11/30; G06F 11/008; G06F 11/079; G06F 11/3409; G06F 11/3452; G06F 11/3604; G06F 11/1402; G06F 11/1469
USPC .............................................. 714/47.3, 1–57
See application file for complete search history.

(56) References Cited

U.S. PATENT DOCUMENTS

| | | | |
|---|---|---|---|
| 8,285,879 B2 * | 10/2012 | Cheifot | H04L 67/12 709/248 |
| 9,440,747 B1 | 9/2016 | Welsh | |
| 10,061,652 B2 | 8/2018 | Johnson et al. | |
| 10,134,437 B2 | 11/2018 | Tsuboi | |
| 10,623,162 B2 | 4/2020 | Bugenhagen et al. | |
| 10,721,135 B1 | 7/2020 | Delson et al. | |
| 10,992,598 B2 | 4/2021 | Grunwald et al. | |
| 10,997,832 B1 | 5/2021 | Vadayadiyil et al. | |
| 2005/0216800 A1 * | 9/2005 | Bicknell | G06F 11/008 714/718 |
| 2006/0179343 A1 * | 8/2006 | Kitamura | G06F 11/2069 714/6.23 |
| 2007/0288208 A1 | 12/2007 | Grigsby et al. | |
| 2009/0119541 A1 | 5/2009 | Inoue et al. | |
| 2010/0046553 A1 * | 2/2010 | Daigle | H04L 69/22 370/474 |

(Continued)

OTHER PUBLICATIONS

U.S. Appl. No. 16/156,832, Mar. 26, 2020, Office Action.
U.S. Appl. No. 16/156,832, filed Oct. 10, 2018, by Wolfson et al.

*Primary Examiner* — Sarai E Butler
(74) *Attorney, Agent, or Firm* — Workman Nydegger (57) ABSTRACT

One example method includes receiving information concerning a threat to stored data, correlating the information with a preemptive action which, when taken, prevents harm to the stored data by the threat, implementing the preemptive action before the threat causes harm to the stored data, and taking an action to at least partly return a system associated with the stored data to a pre-threat state. The threat may be a natural disaster, or a human-caused condition, for example.

20 Claims, 5 Drawing Sheets

(56) References Cited

U.S. PATENT DOCUMENTS

| | | | |
|---|---|---|---|
| 2011/0040703 A1 | 2/2011 | Mickey | |
| 2011/0202735 A1* | 8/2011 | Kono | G06F 11/1458 711/162 |
| 2011/0302460 A1* | 12/2011 | Idgunji | G01R 31/3016 714/55 |
| 2012/0283971 A1* | 11/2012 | Anderson | G06F 11/0787 702/65 |
| 2013/0030990 A1 | 1/2013 | Jay | |
| 2013/0036324 A1* | 2/2013 | Nagasawa | H04L 67/32 714/4.11 |
| 2014/0102013 A1 | 4/2014 | Klink et al. | |
| 2014/0309782 A1 | 10/2014 | Sharpe et al. | |
| 2015/0212909 A1* | 7/2015 | Sporel | G06F 11/2041 714/4.11 |
| 2015/0254150 A1* | 9/2015 | Gordon | G06F 11/1662 714/6.3 |
| 2016/0004610 A1* | 1/2016 | Knight | G06F 11/203 714/4.11 |
| 2016/0092292 A1* | 3/2016 | Lv | G06F 11/079 714/37 |
| 2016/0132397 A1* | 5/2016 | Hui | G06F 11/1415 714/4.11 |
| 2016/0275798 A1 | 9/2016 | Maytal et al. | |
| 2016/0366220 A1* | 12/2016 | Gottlieb | H04L 69/08 |
| 2016/0371316 A1 | 12/2016 | Okanohara | |
| 2017/0242599 A1* | 8/2017 | Patnaik | G06F 11/1662 |
| 2018/0139431 A1 | 5/2018 | Simek et al. | |
| 2018/0181091 A1 | 6/2018 | Funk et al. | |
| 2018/0366792 A1 | 12/2018 | Stachewicz et al. | |
| 2018/0368007 A1 | 12/2018 | Mark | |
| 2019/0080417 A1 | 3/2019 | Amigo et al. | |
| 2019/0171799 A1 | 6/2019 | Crawford et al. | |
| 2019/0188247 A1 | 6/2019 | Weinreb | |
| 2019/0310620 A1 | 10/2019 | Kamiguti | |
| 2019/0349426 A1 | 11/2019 | Smith et al. | |
| 2019/0361697 A1 | 11/2019 | Hu | |
| 2020/0019882 A1 | 1/2020 | Garg et al. | |
| 2020/0022016 A1 | 1/2020 | Fenoglio | |
| 2020/0026786 A1 | 1/2020 | Cadarette | |
| 2020/0034270 A1 | 1/2020 | Desai | |
| 2020/0041316 A1 | 2/2020 | Parush Tzur | |
| 2020/0050965 A1 | 2/2020 | Harvill | |
| 2020/0059417 A1 | 2/2020 | De Buitleir | |
| 2020/0079403 A1 | 3/2020 | Setiawan | |
| 2021/0064459 A1 | 3/2021 | Ramasamy et al. | |

\* cited by examiner

DATACENTER PREEMPTIVE MEASURES FOR IMPROVING PROTECTION USING IOT SENSORS

FIELD OF THE INVENTION

Embodiments of the present invention generally relate to data protection. More particularly, at least some embodiments of the invention relate to systems, hardware, software, computer-readable media, and methods directed to various processes performed in connection with a computing environment such as a data protection environment, including threat assessment, and implementation of preemptive measures relating to a threat.

BACKGROUND

Computing environments such as datacenters are faced with a range of different types of threats. These threats may concern not only physical devices, and software, but also the data itself, whether the data is already stored or in transit between computing systems.

With respect to data integrity, it may be the case that mission critical data and the most important information stored in the datacenter is being replicated to another location using a disaster recovery solution. However, the latest information sent to, or processed by, the applications may not yet have been replicated at the time a problem occurs, so some loss of critical data is to be expected for systems that employ asynchronous replication. Synchronous replication, on the other hand, presents problems of its own. Particularly, while synchronous replication may help to resolve the data loss problem associated with asynchronous replication, synchronous replication slows down the application by incurring latency and is not feasible to be used at all times and in all scenarios.

Some threats to data and computing systems such as datacenters occur in the physical realm. Particularly, while physical breaches of datacenters might be perceived to be somewhat less likely to occur, given the prevalence of cyberattacks, physical breaches such as retrieving information directly, or planting malicious software, nonetheless represent a significant threat to datacenters and the data stored there. For example, malware might compromise systems and data in any of a variety of ways, such as by collecting sensitive information for later physical retrieval, sending data to a remote location, altering the data in a malicious manner, or deleting the data. As some additional examples of threats, data may be stolen or deleted by a perpetrator, or servers/disks might be physically damaged. In other cases, disasters like a perpetrator shutting down the power might also occur.

Threats such as those noted can pose great liability and other legal issues to the company owning or operating the datacenter. This is true whether the data is owned by the company itself or by a third party that is hosted in the datacenter which belongs to service providing firm. The cost, legal and public relation penalties could be disastrous to the company.

Finally, some applications have an alternate location to failover to in case of problems with the production application location, but the time to failover, or recovery time objective (RTO), could be several to tens of minutes, depending on the complexity of the system. In many cases, this is unacceptably slow. Moreover, some modern applications, such as cloud-native 3rd platform applications, can constantly run in more than one location and have the ability to scale-out when needed. In case of downtime to one location, a management system will scale-out the computing resources in other locations and incoming application traffic will be diverted to these alternate locations instead of the failing site. However, this scale-out may take a long time and is not always automatic, resulting in downtime or reduced service level to application users. Thus, this scale-out approach is not effective in some circumstances.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection. More particularly, at least some embodiments of the invention relate to systems, hardware, software, computer-readable media, and methods directed to various processes performed in connection with a computing environment such as a data protection environment, including threat assessment, and implementation of preemptive measures relating to a threat.

In at least some embodiments, a grid of Internet of Things (IoT) sensors is deployed that is configured and arranged to detect various threats to the datacenter, components of the datacenter, and/or data stored in the datacenter. A backend service is also provided that is configured to communicate with the sensors, evaluate the threat or threats detected by the sensors, and provide for the implementation of one or more preemptive measures that are responsive to the detected threat and are calculated to mitigate, or eliminate, potential adverse impact of the threat on the datacenter and the data stored there. As used herein, datacenter is interpreted to embrace not only the datacenter hardware and software, but also the data stored at the datacenter.

In more detail, modern datacenters are the hub of every technological business, either on-premises, or in the cloud. Enterprise information technology (IT) departments employ various data protection paradigms to minimize downtime of production application. For example, data security and IT departments invest huge funds in discovering and blocking security breaches, detecting malicious software and fending off cyber-attacks. As well, physical security also plays an important role in protecting company and customer assets stored in the datacenter or mission critical applications running on its servers.

Security goals may be achieved, at least in part, through the use of IoT sensors for physical security and disaster detection. Surveillance cameras, motion detection sensors and other edge devices may be used to detect intruders and sound burglar alarms. Smoke and gas detectors may be used to trigger fire alarms and get distinguishers in action. Embodiments of the invention employ various threat-detecting IoT sensors inside or outside of a datacenter to trigger preemptive actions inside the datacenter itself, such as when a suspected threat is discovered. Additionally, or alternatively, data from the sensors and/or other sources may not automatically trigger a preemptive action, but will at least serve to cause an analysis of the sensor data, and such analysis may then indicate that one or more preemptive actions should be taken. These actions will help maintain data integrity, business continuity and information security at the highest standard. In brief, datacenter management operations, data protection software(s) and IoT detection devices are connected into a single system that improves the overall protection that can be provided to the datacenter. This approach may reduce downtime and secure the information in the datacenter in case the threat is not mitigated before it begins to affect the datacenter itself. As used herein, preemptive actions embraces both actions that directly affect data associated with the datacenter, such as copying stored data to another location, as well as actions that may indirectly affect the stored data, such as increasing the flow of cool air to the datacenter in response to a nearby fire or other anomalous heat source. While the increased airflow rate does not directly impact the stored data itself, that airflow helps to protect the data by keeping the datacenter at an acceptable temperature, or within an acceptable temperature range.

Advantageously then, embodiments of the invention may provide various benefits relative to conventional systems and methods. To illustrate, embodiments of the invention may improve and enhance the operation and reliability of computing systems such as datacenters by taking preemptive action before a detected threat condition actually begins to adversely affect the datacenter. Thus, for example, embodiments of the invention may help, in the event of a problem, to reduce application downtime and/or minimize possible adverse effects on the application users. To illustrate, by failing over an app to another datacenter in a remote location before the threat causes harm, embodiments of the invention may help to ensure a generally seamless experience for the users of the app such that the users may not even notice that a problem has occurred.

In this way, loss of data and other problems relating to the datacenter can be mitigated, or possibly avoided altogether. As well, embodiments of the invention may be responsive to changing conditions. For example, if the nature of a threat should change, the preemptive actions initially planned to be taken may be cancelled, and alternative preemptive actions planned and taken. Likewise, if a threat fails to materialize for some reason, the preemptive actions may, as appropriate, be canceled, stopped, or reversed, for example. As a final example, various other inputs can be employed in determining whether and when to take a preemptive action, and in determining what the preemptive action should be. To illustrate, a confidence level that a particular threat will actually cause harm to the datacenter may be one input that plays a role in determining the response of the system to the detected threat.

As the foregoing examples illustrate, embodiments of the invention may improve the operation of a computing system, or element of a computing system, and/or may facilitate resolution of one or more technological problems relating to testing, operation, and/or problem diagnosis and resolution, in computing systems, elements, and methods. Aspects of the disclosed processes and methods are discussed below in connection with various illustrative examples.

A. Aspects of an Example Operating Environment

The following is a discussion of aspects of example operating environments for various embodiments of the invention. This discussion is not intended to limit the scope of the invention, or the applicability of the embodiments, in any way.

In general, embodiments of the invention may include and/or be implemented in an operating environment that includes a data protection environment, which may include one or more storage systems including primary storage and data protection storage. In some specific example embodiments of the invention, at least some data protection functionality may be provided by, or implemented in connection with, a platform such as the Dell-EMC DataDomain data protection platform, and associated systems, methods, and components, although use of this particular platform is provided only by way of illustration and is not required. More generally, embodiments of the invention may be employed in connection with various other data protection platforms, examples of which include, but are not limited to, any of the products in the Dell EMC DP Suite of data protection products.

The data protection environment may take the form of a cloud storage environment, an on-premises storage environment, and hybrid storage environments that include public and private elements, although the scope of the invention extends to any other type of data protection environment as well. Any of these example data protection environments, may be partly, or completely, virtualized. The data protection environment may comprise, or consist of, a datacenter which is operable to service read and write operations initiated by one or more clients.

In addition to the data protection environment, the operating environment may also include one or more host devices, such as clients for example, that each host one or more applications. As such, a particular client may employ, or otherwise be associated with, one or more instances of each of one or more applications. In general, the applications employed by the clients are not limited to any particular functionality or type of functionality. Some example applications and data include email applications such as MS Exchange, database applications such as SQL Server, filesystems, as well as datastores such as Oracle databases for example. The applications on the clients may generate new and/or modified data that is desired to be protected.

Any of the devices, including the clients, servers and hosts, in the operating environment can take the form of software, physical machines, or virtual machines (VM), or any combination of these, though no particular device implementation or configuration is required for any embodiment. Similarly, data protection system components such as databases, storage servers, storage volumes, storage disks, replication services, backup servers, restore servers, backup clients, and restore clients, for example, can likewise take the form of software, physical machines or virtual machines (VM), though no particular component implementation is required for any embodiment. Where VMs are employed, a hypervisor or other virtual machine monitor (VMM) can be employed to create and control the VMs.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Example embodiments of the invention are applicable to any system capable of storing and handling various types of objects, in analog, digital, or other form. Although terms such as document, file, block, or object may be used by way of example, the principles of the disclosure are not limited to any particular form of representing and storing data or other information. Rather, such principles are equally applicable to any object capable of representing information.

Figure 1:
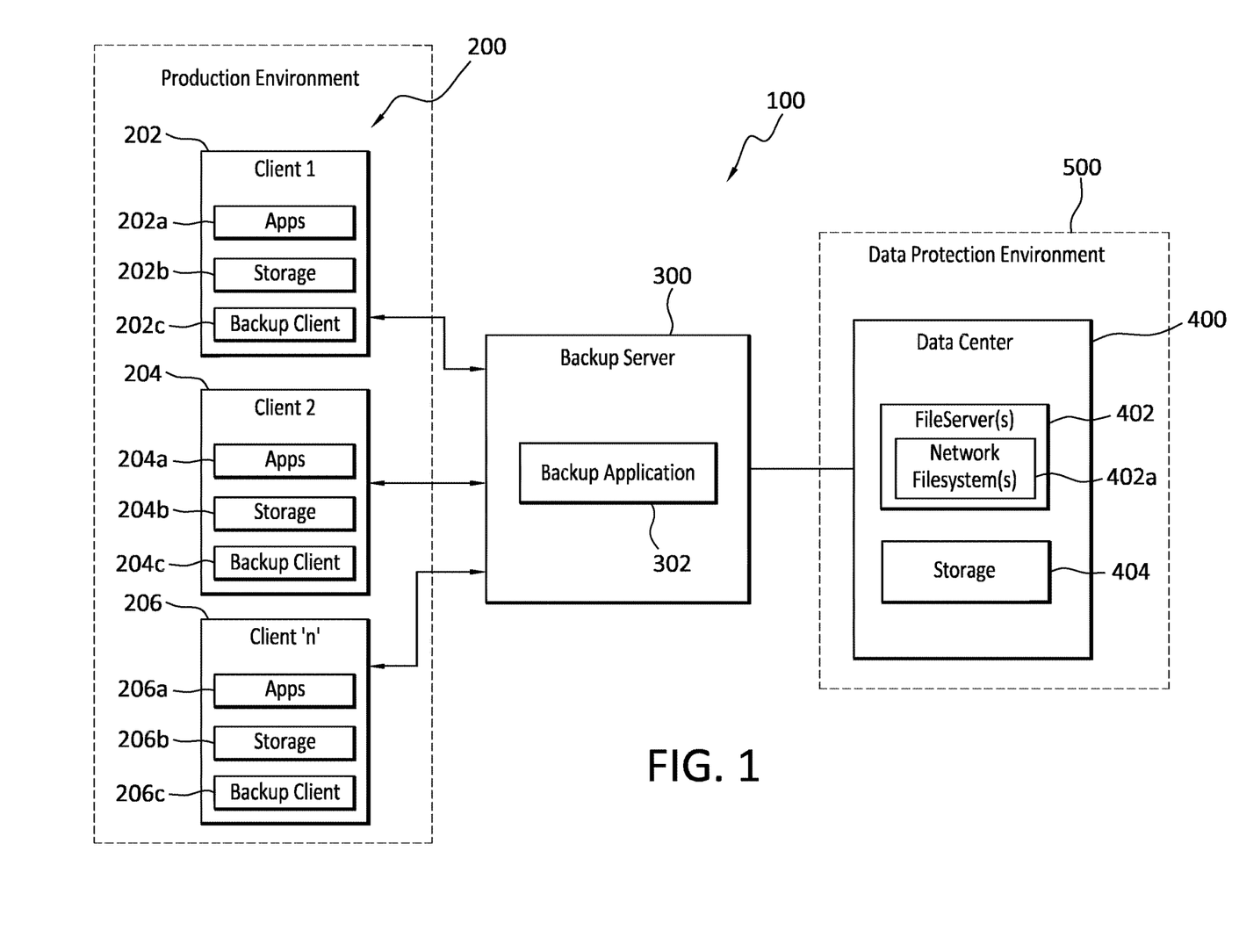
FIG. 1 discloses aspects of an example operating environment for some embodiments of the invention.

With particular reference now to FIG. 1, an example operating environment 100 may include a plurality of clients 200, such as clients 202, 204 and 206. Each of the clients 200 may host one or more applications 202a, 204a and 206a, respectively, that create new and/or modified data that is desired to be protected. As such, the clients 200 are examples of host devices. One, some, or all, of the clients 200 may take the form of a VM, although that is not required. In general, the VM is a virtualization of underlying hardware and/or software and, as such, one or more of the clients 200 may include or otherwise be associated with various underlying components.

As well, each of the clients 200 may include respective local storage 202b, 204b and 206b. The local storage 202b, 204b and 206b can be used to store data, which may be backed up as described below. The backup data can be restored to local storage 202b, 204b and 206b. The clients 200 may each also include a respective backup client application 202c, 204c and 206c. As shown in FIG. 1, and discussed in connection with FIG. 2, the clients 200 may collectively form a portion of a Production Environment.

With continued reference to FIG. 1, the example operating environment 100 may further include one or more backup servers, such as a backup server 300 that includes a backup application 302. The backup application 302 may cooperate with one or more of the backup clients 202c, 204c, or 206c to backup client 202, 204 and 206 data and/or applications 202a, 204a, and 206a, at a datacenter 400 of a data protection environment 500. The backup application 302 may also cooperate with one or more of the backup clients 202c, 204c, or 206c to restore backed up client 202, 204 and 206 data from the datacenter 400 to the clients 202, 204 and 206. In some embodiments, the backup server 300 may be an EMC Corp. Avamar server or an EMC Corp. Networker server, although no particular server is required for embodiments of the invention.

The data protection environment 500 may be implemented as a Dell-EMC DataDomain data protection environment, although that is not required. The data protection environment 500 may support various data protection processes, including data replication, cloning, data backup, and data restoration, for example. As indicated, the data protection environment 500, may comprise or consist of datacenter 400, which may be a cloud storage datacenter in some embodiments, that includes one or more network fileservers 402 that are accessible, either directly or indirectly, by the clients 200. Each of the network fileservers 402 can include one or more corresponding network filesystems 402a, and/or portions thereof.

The datacenter 400 may include and/or have access to storage 404, such as a data storage array for example, that communicates with the network filesystems 402a. In general, the storage 404 is configured to store client 200 data backups that can be restored to the clients 200 in the event that a loss of data or other problem occurs with respect to the clients 200. The term data backups is intended to be construed broadly and includes, but is not limited to, partial backups, incremental backups, full backups, clones, snapshots, continuous replication, and any other type of copies of data, and any combination of the foregoing. Any of the foregoing may, or may not, be deduplicated.

The storage 404 can employ, or be backed by, a mix of storage types, such as Solid State Drive (SSD) storage for transactional type workloads such as databases and boot volumes whose performance is typically considered in terms of the number of input/output operations (IOPS) performed. Additionally, or alternatively, the storage 404 can use Hard Disk Drive (HDD) storage for throughput intensive workloads that are typically measured in terms of data transfer rates such as MB/s.

Finally, it should be noted that while FIG. 1 generally embraces a backup use case, the scope of the invention is not so limited. For example, embodiments of the invention can also be implemented and employed in connection with data replication systems, or any other type of data protection system. One example of such a data replication system is the Dell EMC RecoverPoint replication system.

B. Aspects of Some Example Systems and Components

Figure 2:
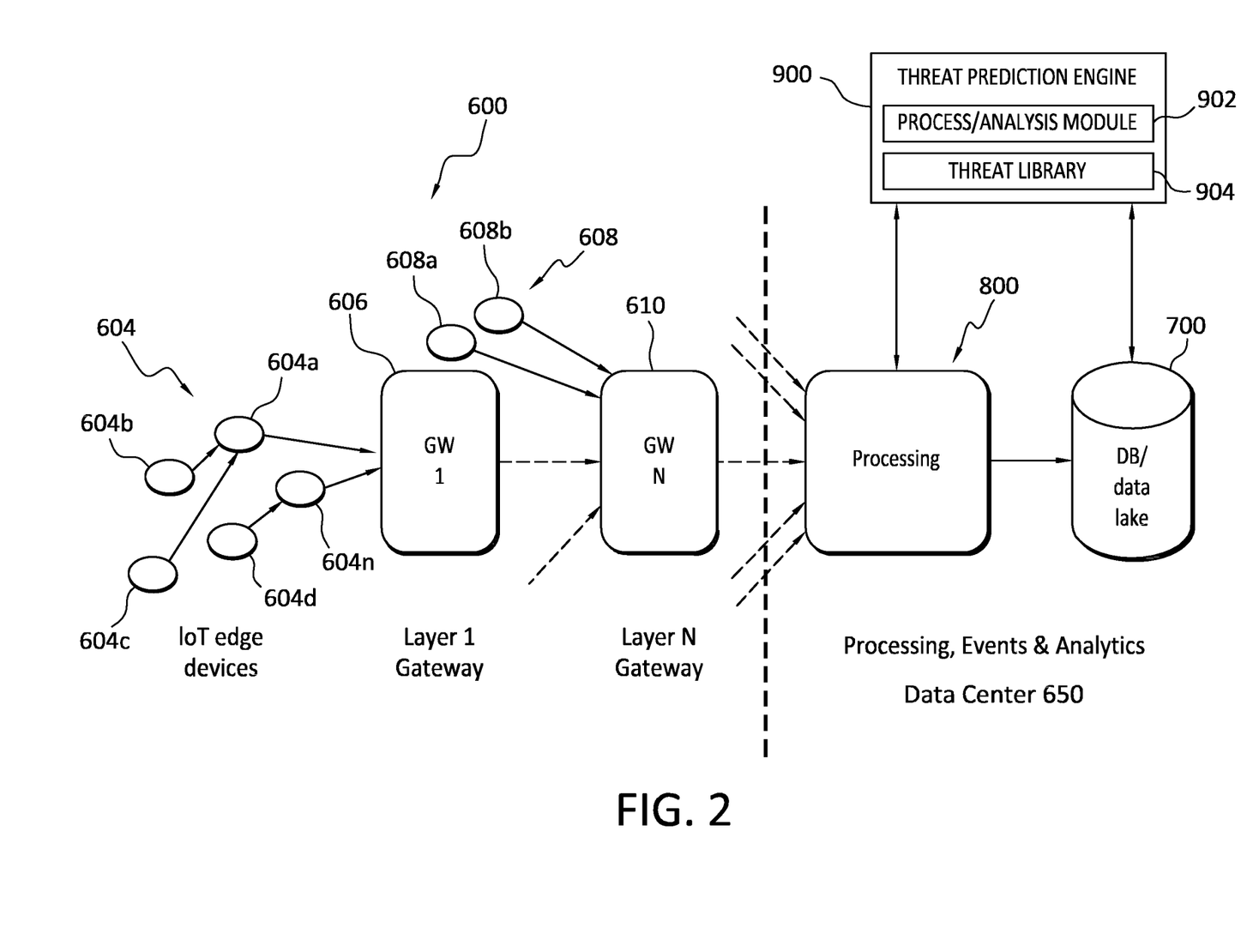
FIG. 2 discloses aspects of an example system configuration.

With attention now to FIG. 2, details are provided concerning an example implementation of a system operable to detect a threat and take a preemptive action responsive to the detected threat. It should be noted that a system within the scope of the invention can include any combination of the example elements disclosed in FIG. 2. Thus, in some embodiments, a system comprises elements 600 through 610. In still other embodiments, a system comprises elements 700 and 800, and in still other embodiments, a system comprises element 900. As such, it will be appreciated that the disclosed components and associated functionalities can be combined together in any suitable fashion and, as such, the scope of the invention is not limited to the illustrative example of FIG. 2. Likewise, the functionalities disclosed herein can be allocated in any suitable manner among the components of FIG. 2 and, as such, the scope of the invention is not limited to the illustrative functional allocation of FIG. 2.

With particular attention now to FIG. 2, a system 600 may comprise an array 604 of one or more sensors 604a . . . 604n, one, some or all, of which may be IoT sensors. IoT sensors may alternatively be referred to as IoT edge sensors and embrace, but are not limited to, sensors, actuators or any other devices that produce information and/or are responsive to commands to control the environment they are in. As used herein, the term sensors embraces both sensors, such as those examples listed immediately below, and alarms, and sensors within the scope of this disclosure may operate automatically and/or may be manually activated. In general, the type, number, location, and combination, of sensors may be based on considerations including, but not limited to, the type(s) of threats most likely to be encountered, and the proximity of potential threat sources to the datacenter, and the amount of time needed to implement one or more preemptive actions once a threat has been identified.

Sensors that may be employed in connection with embodiments of the invention include, but are not limited to, fire and smoke detectors, gas detectors, leak and flooding detectors, humidity gauges, temperature gauges, seismometers, motion detectors, security cameras with automatic motion/threat detectors, burglar alarms, voltage and electric current detectors, pressure sensors, airflow meters, noise detectors, and chemical detectors and sensors. Other sensors within the scope of the invention may be manually activated, such as a manually activated fire alarm for example, or an intruder alert or panic button, as another example. The foregoing and/or other sensors can be employed in any combination, type, and number.

The sensors 604a . . . 604n can be employed in any location, or locations, where they are able to detect actual and/or potential threats to a datacenter. Example locations for one or more sensors include within the datacenter itself, within individual datacenter components, in buildings and/or other facilities adjacent to the datacenter, in the outside environment around the datacenter, and in any other location where detection of a threat or potential threat at that location would provide adequate time for corresponding preemptive action(s) to be identified and taken.

The sensors need not necessarily be located in a close proximity to the datacenter itself. For example, preemptive operations can be started if there is a fire, for instance, on adjacent floors or in nearby buildings. Moreover, many disasters have a cascading effect, for example, fires are usually followed by power outages. Thus, even if the disaster were contained at a location remote from the datacenter and has not reached the datacenter itself, the datacenter might still be affected for a period of time.

As disclosed in FIG. 2, it can be seen that multiple groups of sensors may be employed. Thus, in addition to the sensor array 604, another sensor array 608 including sensors 608a and 608b may additionally be employed. In some embodiments, different sets of sensors are employed in different respective locations or environments, although that is not required.

With continued reference to the example of FIG. 2, embodiments of the invention may receive, process, and act upon, inputs from sources other than, or in addition to, sensors such as those examples included in the sensor arrays 604 and 608. To illustrate, threats such as large natural disasters like earthquakes, wildfires, tornados and tsunamis may not be readily detected by local sensors located in, or relatively close to, the datacenter. Thus, embodiments of the invention are configured to implement one or more preemptive actions based in part, or in whole, on one or more external triggers, information, or other content, received from one or more third parties.

National control centers, such as a weather service for example, that detect such events could send special notifications in these scenarios, and preemptive measures may automatically be applied by embodiments of the invention. Such special notifications may include, for example, information about any one or more of the specific nature of the threat, such as fire, flood, or wind for example, the expected impact of the threat to infrastructure, the estimated time of the expected impact, and any other information. Special notifications may also include information about civil unrest, such as riots for example, or other similar problems and events.

Other examples of external triggers include, but are not limited to, law enforcement agency notifications regarding physical breaches, and fire department notifications regarding fires that are in, or are expected to be, in the vicinity of the datacenter and/or areas of infrastructure, such as power plants or electric transmission towers for example, damage to which may affect datacenter operations and data. As a final example, other alarm systems in the vicinity of the datacenter, such as from a similar detection system in a nearby datacenter, can serve as an external trigger as well.

With continued reference to FIG. 2, the system 600 may optionally include one or more gateways, such as gateway 606 and gateway 610 for example. Any number 'n' of gateways may be used. In general, gateways refer to systems and/or devices configured to consolidate communication and management of multiple edge devices, such as the sensors in IoT sensor arrays 604 and 608, for example. Gateways may be employed where, for example, edge device networking capabilities are local in nature, whether with respect to power and/or connectivity, and the gateway is used by the edge devices to connect to the internet and/or to another communication network.

As shown, a gateway may be dedicated to a particular array or group of sensors, although that is not required. In the illustrated example, the sensor array 604 communicates by way of gateway 606, while the sensor array 608 communicates by way of gateway 610. Any of the connections between the elements shown in FIG. 2 may be wireless, or hardwired, connections. As also indicated, gateways such as gateway 606 and gateway 610 may be referred to as corresponding to respective layers, such as Layer 1 and Layer 'n,' for example. The layers may be layers in a communication configuration. Moreover, the gateway in the highest layer in a communication configuration, such as the gateway 610, may communicate with one or more other gateways at lower layers, such as the gateway 606. As well, the gateways may be arranged in series with each other, although that is not necessarily required and a parallel gateway arrangement could also be used. In the example illustrated configuration, the layer 'n' gateway 610 consolidates all communications from the lower layers, such as layer 1.

As further indicated in FIG. 2, data storage functionalities associated with the system 600 may be implemented by a datacenter 650. The datacenter 650 may include storage 700 that may comprise a database (DB) and/or data lake configuration, either or both of which may also be elements of a datacenter. More generally however, the storage 700 embraces any system and/or components operable to store data and respond to read and write requests. In more detail, the storage 700 may be used to save incoming data from the sensors in IoT sensor arrays 604 and 608, after that data has been processed by a processing server 800 which is able to communicate with the storage 700.

In general, the processing server 800 and/or other components may be programmed to receive sensor inputs in the form of data, such as by way of one or more gateways, and perform processing and/or analytics with respect to that sensor data. That is, the raw data provided by the sensors can be received and processed by the processing server 800. The processing server 800 may, but need not, be an element of the datacenter 650.

Processed and/or unprocessed data can be passed from the processing server 800 to a threat prediction engine 900 that may, or may not, reside at the datacenter 650. Among other things, the threat prediction engine 900 is able to receive and transmit data, to and from, the processing server 800 and storage 700. In general, the threat prediction engine 900 is configured, and operates, to identify and evaluate threats, and to implement, or cause the implementation of, one or more preemptive actions responsive to the threats. Examples of such threats include, but are not limited to, fire, flood, power outages, and gas or chemical leaks. Other examples of threats are disclosed elsewhere herein. The threat prediction engine 900 can then determine, based on the threat(s) identified, what, if any, preemptive actions should be taken with respect to the protection of the data protection environment with which the system 600 is associated. Once the preemptive actions have been identified, the threat prediction engine 900 may, on its own or in cooperation with other elements such as the processing server 800, then implement, and/or cause the implementation of, those preemptive actions.

To these ends, the threat prediction engine 900 may include a process/analysis module 902, and a threat library 904. The threat library 904 may include a table or other database or data structure that maps one or more preemptive actions to a particular threat. The process/analysis module 902 may receive raw sensor data, and then process the sensor data to identify corresponding preemptive actions. The process/analysis module 902 may also implement, or cause the implementation of, those preemptive actions, as well as control the performance, timing, and/or other parameters, of the preemptive actions.

The threat prediction engine 900 may operate in a feedback configuration with the sensor arrays 604 and/or 608 in which the processing server 800 continuously, or periodically, receives input from the sensor arrays 604 and/or 608, and then passes the input along to the threat prediction engine 900 which then implements, or causes the implementation of, any appropriate adjustments to the preemptive actions that are in process, and/or that are scheduled for implementation. For example, if a sensor gives false positive indication of a threat, a preemptive action in process, or scheduled, can be stopped, reversed, and/or canceled, by the threat prediction engine 900 if/when it is later determined that the sensor indication was a false positive. This functionality may also enable the troubleshooting and repair/replacement of faulty sensors, which may be useful inasmuch as it may help to avoid unnecessary implementation of possibly expensive and time-consuming preemptive actions.

The threat prediction engine 900 may communicate, and operate in connection, with any one or more components, which may or may not be datacenter components, to implement, and/or cause the implementation of, one more preemptive actions. Such components (not shown) may include, for example, databases, database servers, metadata servers, backup servers, backup systems, restore servers, restore systems, storage systems, storage disks, communication components and communication networks, memory devices, storage devices, climate control systems, power sources, power distribution systems, and/or any other components which may be operable to carry out a portion, or all, of a preemptive action.

In connection with the discussion of FIG. 2, it is noted that the functionality implemented by the system 600, storage 700, processing server 800, and threat prediction engine 900 need not be allocated as shown in that example configuration. More generally, such functionality can be allocated in any other suitable manner. Thus, for example, any one or more of the system 600, storage 700, processing server 800, and threat prediction engine 900 may be owned and/or operated by the same enterprise that operates the datacenter which includes that data and components that are to be protected, and some or all of the functionality of the aforementioned elements may be implemented at the datacenter 650, such as the processing performed by processing server 800. As another example, the functionality of the storage 700, processing server 800, and/or threat prediction engine 900 may be provided as a service, such as a subscriber service for example, to one or more clients, such as by a landlord or owner of a business park to its tenants. The foregoing are presented only by way of example and are not intended to limit the scope of the invention in any way.

Figure 2A:
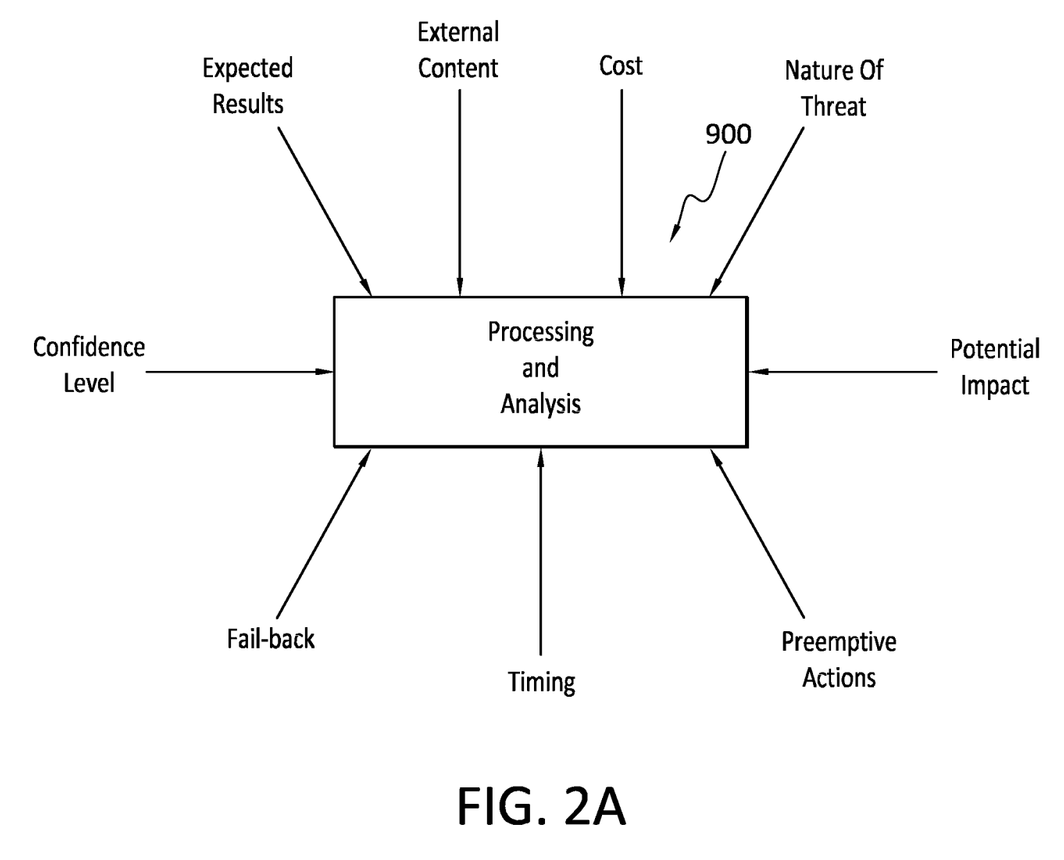
FIG. 2a discloses aspects of example inputs to a system.

With continuing reference to FIG. 2, and directing attention now to FIG. 2a, further details are provided concerning the functionality of the threat prediction engine 900. As shown in FIG. 2a, the processing and evaluation performed by, and/or at the direction of, the threat prediction engine 900 may consider and evaluate a variety of inputs in reaching a conclusion as to (i) whether or not to take a preemptive action; and (ii) what form any such preemptive action should take. Such inputs include, by way of example: the cost to implement a preemptive action; the nature of the threat identified; the potential impact in terms of costs and/or other considerations if the preemptive action is not taken; the nature of any preemptive actions that may be taken; the timing of any preemptive actions, that is, when such preemptive actions may, or should, be taken; the cost, in financial and time terms, of fail-back operations after the threat has passed, the confidence level that a perceived threat will materialize in such as way as to cause actual harm to the datacenter; the expected results of implementing, or not, a preemptive action responsive to the threat identified; and, external content, such as information about events from external sources such as law enforcement, fire departments, governmental agencies, and neighboring threat detection and analysis systems.

C. Example Host and Server Configurations

Figure 3:
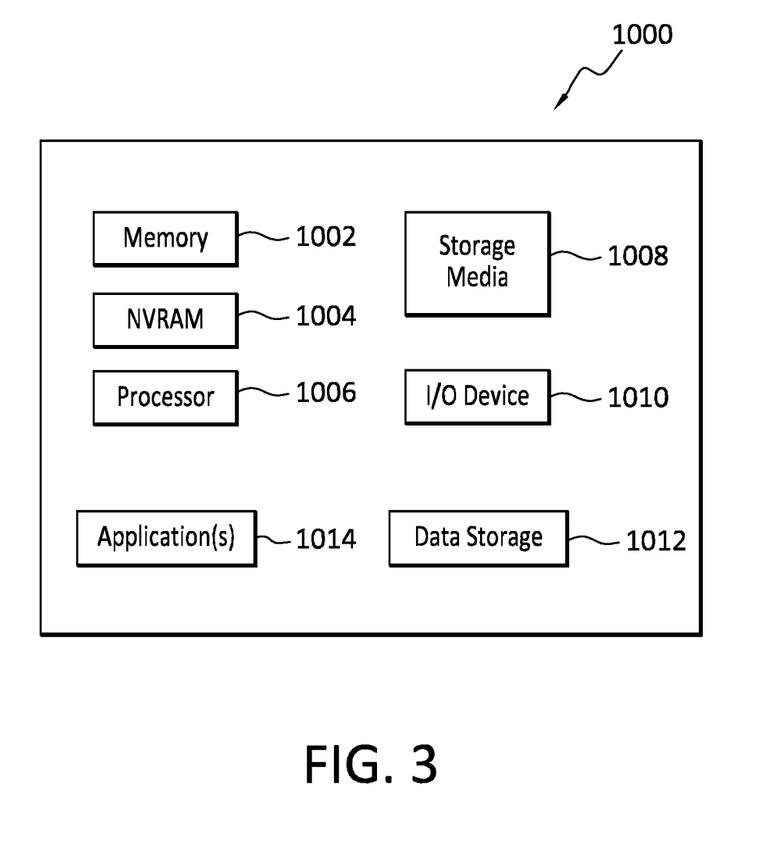
FIG. 3 discloses aspects of an example host configuration.

With reference briefly now to FIG. 3, any one or more of the clients 200 and its components, backup server 300, data center 400 and its components, data protection environment 500 and its components, sensor arrays 604 and 608, gateways 606 and 610, storage 700, processing server 800, and threat prediction engine 900, can take the form of a physical computing device, one example of which is denoted at 1000. As well, where any of the aforementioned elements comprise or consist of a VM, that VM may constitute a virtualization of any combination of the physical components disclosed in FIG. 3.

In the example of FIG. 3, the physical computing device 1000 includes a memory 1002 which can include one, some, or all, of random access memory (RAM), non-volatile random access memory (NVRAM) 1004, read-only memory (ROM), and persistent memory, one or more hardware processors 1006, non-transitory storage media 1008, I/O device 1010, and data storage 1012. One or more of the memory components 1002 of the physical computing device can take the form of solid state device (SSD) storage. As well, one or more applications 1014 are provided that comprise executable instructions. Such executable instructions can take various forms including, for example, instructions executable by a process/analysis module 902 of a threat prediction engine 900 to identify threats and implement corresponding preemptive actions.

D. Some Example Threats and Preemptive Actions

As noted herein, the present disclosure embraced the deployment of a grid of IoT sensors and a backend service that will detect various threats to the datacenter and take preemptive measures to reduce downtime and secure the information in case the threat is not mitigated before it reaches the datacenter itself. It will be appreciated that there is a variety of possible problems and conditions that might threaten, or adversely affect, a datacenter. Some examples of such problems, and associated preemptive action, will now be considered.

Potential threats to a datacenter include natural and human-caused disasters. In the cases of natural disasters, fires or power outages, it is desirable to keep data integrity and provide the best business continuity. In cases such as these, there are various preemptive measures that may be taken when a threat has been detected.

The following is a non-exclusive list of some example preemptive measures.

1. Perform automatic failover of applications (critical first) to a remote site. This approach can reduce Recovery Time Objective (RTO), and application/system downtime. As well, another preemptive action would be to effect automatic migration/vmotion of applications to a remote site. As used herein, vmotion refers to the migration of running virtual machines from one physical server to another with limited, or zero, downtime, continuous service availability, and complete transaction integrity. The difference between these two approaches is that in the latter case, the detection system integrates together with the virtual infrastructure rather than with the data protection software. It should be noted that as used herein, RTO refers to the target time set for the recovery of systems, applications, and business activities after a disaster has struck. In general, a shorter RTO may be relatively more expensive to implement than a relatively longer RTO since the shorter RTO requires a relatively quick recovery, while the longer RTO permits the use of less advanced and complex solutions.

2. Move to synchronous (Sync) replication of data and/or applications instead of asynchronous (Async) replication. This approach will temporarily reduce application performance but will also ensure that no data is lost in case the threat becomes real. That is, because Sync replication verifies that data is stored before sending additional data for storage, there is a low likelihood that data will be lost. On the other hand, no such verification is employed with Async replication. Rather, the data is continuously streamed to the backup destination. In general, one focus of this approach, that is, switching from Async to Sync, is to reduce a Recovery Point Objective (RPO). As used herein, RPO concerns the data and the loss tolerance of the enterprise in relation to that data. In general, RPO is determined by looking at the time between data backups and the amount of data that could potentially be lost in between backups. Thus, the enterprise must determine how much data it can afford to lose before the business suffers. For example, an RPO of 10 minutes means that all data saved in the last 10 minutes might not be restored. Thus, the enterprise must determine whether or not it can operate acceptably without data saved in the last 10 minutes.

3. For periodically replicated or backed-up applications, take a snapshot of the data immediately instead of waiting for the next snapshot cycle. Again, this approach would reduce the RPO.

4. Take an application-consistent snapshot. If failover is eventually required, this could reduce the amount of time needed for the application to recover from the image. This approach would reduce both RPO and RTO.

5. Start powering up the application resources in a remote location, that is, remote from the datacenter, in order to reduce the time to failover, in case it is required. This approach would reduce RTO.

6. In cases of replication to a low-cost object store, for example in the cloud, start recovery of the application data from object store to block storage. This approach would reduce RTO.

7. Auto-scale out the service in one or more other locations, that is, locations other than the threatened datacenter, ahead of time, that is, before the threat causes actual harm to the data center. This approach would reduce RTO.

8. Hand-off user sessions to other servers in locations remote from the datacenter. This approach will reduce the load on production servers in the compromised location, and will also avoid disconnections from end users in case the threat materializes. This can be done at various levels, such as at a load balancer level, user management level, or by network rerouting. Advantageously, this approach would reduce RTO, and would also provide a seamless experience for the users. That is, the users would not be aware of the hand-off having taken place.

9. Shut down non-critical applications, or shut down applications according to reverse priority. This hierarchical approach frees compute and networking resources so that higher priority applications will have a better chance of completing their preemptive measures.

Yet other potential threats to a datacenter include various types of security breaches, such as physical breaches of the datacenter. Such security breaches can be detected, for example, by motion detectors, security cameras, infra-red sensors, and/or other sensors disclosed herein. The potential consequences of such threats include, but are not limited to, loss or corruption of sensitive data and shutdown, loss of, or damage to datacenter servers. In cases such as these, there are various preemptive measures that may be taken when a threat has been detected.

The following is a non-exclusive list of some example preemptive measures.

1. Failover critical applications, and shut down servers. Actions such as these can block access to the datacenter systems, and also delay anyone trying to log in locally or trying to introduce malicious software by connecting a flash drive or other portable media. These actions can also be used to erase all in-memory sensitive data which is by nature decrypted. The data on storage, such as disks, can be set to be encrypted in advance of any preemptive action. That is, the data on disks may already have been encrypted and so is less vulnerable to a physical breach.

2. Encrypt critical data. In the event that some of the application data is unencrypted, it may be useful to take the opportunity to encrypt such application data as a preemptive measure.

3. Purge sensitive data. To reduce or eliminate risk, the threatened data can be wiped, that is, deleted.

As should be apparent, some of these measures are extreme and costly, and so may only be taken in cases where a confidence level is high that a threat is real, and that adverse action will occur and not be stopped or prevented in time. As well, it will be appreciated that any of the preemptive actions disclosed herein can be combined with any one or more other preemptive actions, depending upon the particular circumstances. As but one example, threatened data could first be synchronously replicated, and then deleted. In this way, a copy of the data is created at a secure location, and the threatened copy is deleted so that it cannot be accessed.

E. Some Further Considerations

It is noted that it may be useful to strike an appropriate cost-benefit balance between the cost of implementing a particular preemptive course of action, and the benefit received, or expected to be received, as a consequence of such implementation. Thus, for example, most or all preemptive courses of action involve a cost, which may, or may not, be primarily or strictly financial. For example, a loss of data due to physical break-in may have a financial cost to an enterprise, as well as a reputational cost if the enterprise is viewed as being unable to adequately protect customer data. In some embodiments, quantifiable costs such as the financial costs associated with a data replication process for example, can reside in a table or database that is accessible to, or part of, the system, such as the system 600, and may be used as a basis for implementing, or not, one or more preemptive actions. Another example of such quantifiable costs is the amount of time that would be necessary, for example, to return the datacenter to normal operations after a particular threat has passed.

In general, a preemptive measure will incur some type of cost, which may be sunk if the perceived threat fails to materialize in a way that causes harm to the datacenter. In such cases, which may be referred to as false-positive alarms or threats that have been handled before reaching the datacenter, a cost would be incurred to undo, stop, fail-back, and/or reverse, the preemptive operation and return to normal operations. Thus, a balance should be found between performing the preemptive actions, and the risk of not taking those actions. As a general rule, it may be desirable to keep the cost of preemptive measures relatively low if the risk of false-positive detected threats is high. Finally, even if the risk of a threat and/or the cost of a false-positive is relatively low, it may nonetheless be decided to implement the preemptive action if the potential adverse consequences to the datacenter are significant.

As the foregoing examples demonstrate, the analysis performed by embodiments of the invention may take a variety of considerations into account when identifying and implementing one or more preemptive actions. Such considerations may include assessment of the likelihood that a threat will materialize such that harm will result to the datacenter, the type and extent of potential harm to the datacenter from the threat, and the cost of implementing, and/or failing back, any preemptive actions.

F. Aspects of Some Example Methods

Figure 4:
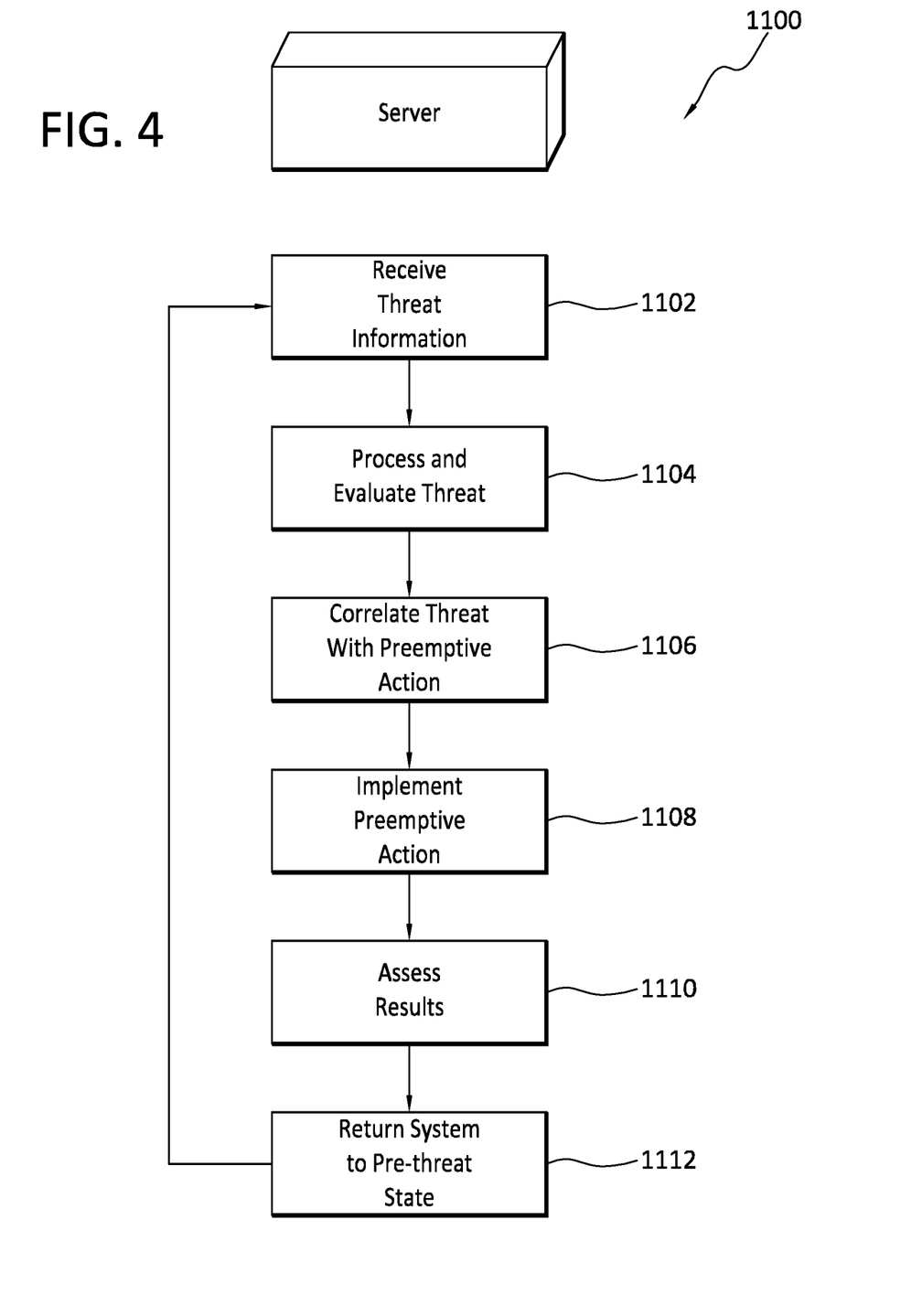
FIG. 4 discloses aspects of some example methods.

With reference now to FIG. 4, details are provided concerning a method, denoted generally at 1100, for implementing various aspects of the disclosed functionality. The method, which may be performed in whole or in part by one or more servers individually or cooperatively, such as the processing server 800 and/or the threat prediction engine 900, may begin at 1102 where information concerning one or more threats is received, such as from a sensor or third party system, for example. The received threat information may then be processed and evaluated 1104, such as by considering parameters such as those identified in the discussion of FIG. 2a. The processing and evaluation can include, for example, deciding whether or not a preemptive action will be taken.

The threat information, as well as the results of the processing and evaluation, can then be correlated 1106 with one or more preemptive actions that are responsive to the particular threat identified. Such preemptive actions may be listed in a threat library, or elsewhere. After a responsive preemptive action has been identified 1106, that preemptive action may then be implemented 1108, and the results of the preemptive action assessed 1110. For example, testing and analyses may be performed to determine whether or not threatened data was successfully replicated to an off-site location before the threat materialized in such as way as to actually damage or destroy the threatened data. In some embodiments, the processing and evaluation 1104 may be omitted, and the preemptive action taken 1108 automatically after correlation 1106 of the threat with the preemptive action.

Finally, when the threat has passed, been contained, or otherwise no longer considered to represent a danger to the datacenter, the datacenter and/or applicable systems can be returned 1112 to a pre-threat state, that is, the state in which the datacenter or other systems were in prior to detection of the threat. The process 1112 may involve, for example, performing a fail-back process that reverses a preemptive action that was previously taken 1108. For example, data replicated to an off-site location in response to a threat may be restored to the datacenter, and the replica data then deleted.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising the operations:
   receiving information concerning a threat to stored data, wherein a portion of the information is generated by, and received from, one or more sensors that monitor and report on one or more physical aspects of a physical volume within which elements of a data protection system are located, and one of the sensors that monitors and reports on a physical aspect of the physical volume does not monitor or report on performance of a physical component;
   correlating the information with a preemptive action which, when taken, prevents harm to the stored data by the threat; and
   implementing the preemptive action before the threat causes harm to the stored data, and implementation of the preemptive action is based on a cost to implement failback operations necessitated by implementation of the preemptive action and the implementation is also based on a confidence level that the threat is real and will cause harm to the stored data.

2. The method as recited in claim 1, wherein the physical volume is defined by a building and the stored data resides at a datacenter at least partially located within the building.

3. The method as recited in claim 1, wherein some of the information is received from a national control center.

4. The method as recited in claim 1, wherein the operations are performed for a third party as part of a subscription service to which the third party is subscribed.

5. The method as recited in claim 1, wherein one or more of the sensors is located within the physical volume.

6. The method as recited in claim 1, wherein the harm prevented by the preemptive action comprises one or more of a loss of the stored data, theft of the stored data, and/or corruption of the stored data.

7. The method as recited in claim 1, wherein the some of the information is received from a sensor that is not included in the one or more sensors and that is located external to, and remote from, the physical volume.

8. The method as recited in claim 1, wherein implementation of the preemptive action causes a reduction to one or both of a Recovery Point Objective (RPO) and a Recovery Time Objective (RTO), relative to what the RPO and/or RTO would have been, respectively, had the preemptive action not been taken.

9. The method as recited in claim 1, wherein the threat is a natural disaster, or a human-caused condition, and the preemptive action comprises any one or more of copying some of the stored data, encrypting some of the stored data, and purging some of the stored data.

10. A non-transitory storage medium having stored therein instructions which are executable by one or more hardware processors to perform operations comprising:
    receiving information concerning a threat to stored data, wherein a portion of the information is generated by, and received from, one or more sensors that monitor and report on one or more physical aspects of a physical volume within which elements of a data protection system are located, and one of the sensors that monitors and reports on a physical aspect of the physical volume does not monitor or report on performance of a physical component;
    correlating the information with a preemptive action which, when taken, prevents harm to the stored data by the threat; and
    implementing the preemptive action before the threat causes harm to the stored data, and implementation of the preemptive action is based on a cost to implement failback operations necessitated by implementation of the preemptive action and the implementation is also based on a confidence level that the threat is real and will cause harm to the stored data.

11. The non-transitory storage medium as recited in claim 10, wherein the physical volume is defined by a building and the stored data resides at a datacenter at least partially located within the building.

12. The non-transitory storage medium as recited in claim 10, wherein the preemptive action comprises failing over an application to a datacenter, so as to avoid possible downtime of the application that would otherwise occur as a result of the threat.

13. The non-transitory storage medium as recited in claim 10, wherein some of the information is received from a sensor that is not included in the one or more sensors and that is located external to, and remote from, the physical volume.

14. The non-transitory storage medium as recited in claim 10, wherein one or more of the sensors is located within the physical volume.

15. The non-transitory storage medium as recited in claim 10, wherein the harm prevented by the preemptive action comprises one or more of a loss of the stored data, theft of the stored data, and/or corruption of the stored data.

16. The non-transitory storage medium as recited in claim 10, wherein the threat comprises a physical threat to the stored data.

17. The non-transitory storage medium as recited in claim 10, wherein implementation of the preemptive action causes a reduction to one or both of a Recovery Point Objective (RPO) and a Recovery Time Objective (RTO), relative to what the RPO and/or RTO would have been, respectively, had the preemptive action not been taken.

18. The non-transitory storage medium as recited in claim 10, wherein the threat is a natural disaster, or a human-caused condition, and the preemptive action comprises any one or more of copying some of the stored data, encrypting some of the stored data, and purging some of the stored data.

19. The non-transitory storage medium as recited in claim 10, wherein the operations are performed for a third party as a part of a subscription service to which the third party is subscribed.

20. A system, comprising:
    one or more hardware processors; and
    a non-transitory storage medium having stored therein instructions which are executable by the one or more hardware processors to perform operations comprising:

receiving information concerning a threat to stored data, wherein a portion of the information is generated by, and received from, one or more sensors that monitor and report on one or more physical aspects of a physical volume within which elements of a data protection system are located, and one of the sensors that monitors and reports on a physical aspect of the physical volume does not monitor or report on performance of a physical component;

correlating the information with a preemptive action which, when taken, prevents harm to the stored data by the threat; and implementing the preemptive action before the threat causes harm to the stored data, and implementation of the preemptive action is based on a cost to implement failback operations necessitated by implementation of the preemptive action and the implementation is also based on a confidence level that the threat is real and will cause harm to the stored data.

\* \* \* \* \*